United States Patent [19]
Floyd, Jr. et al.

[11] Patent Number: 6,066,373
[45] Date of Patent: May 23, 2000

[54] ELASTOMERIC YARN SUPPORT TUBE AND METHOD OF MAKING SAME

[75] Inventors: Arnold B. Floyd, Jr.; Richard K. Mims, both of Hartsville, S.C.

[73] Assignee: Sonoco Development, Inc., Hartsville, S.C.

[21] Appl. No.: 09/144,204

[22] Filed: Sep. 1, 1998

[51] Int. Cl.$^7$ .............................. B65H 75/18; F16L 9/16
[52] U.S. Cl. .................. 428/34.3; 428/36.91; 428/337; 428/339; 138/140; 138/144; 242/610.1; 242/610.4; 242/610.6; 242/613.5; 242/118.32; 229/93; 229/4.5; 156/187; 156/188; 156/277
[58] Field of Search .................... 428/34.2, 34.3, 428/195, 339, 337, 36.91; 242/610.4, 610.1, 118.32, 613.5, 610.6; 138/144, 140; 229/93, 4.5; 220/679, 678, 62.22, 62.2, 62.19; 156/190, 195, 187, 185, 188, 277

[56] References Cited

U.S. PATENT DOCUMENTS

| | | | |
|---|---|---|---|
| 2,349,730 | 5/1944 | Horning | 229/4.5 |
| 2,555,380 | 6/1951 | Stuart et al. | 229/4.5 |
| 2,914,833 | 12/1959 | Hart, Jr. et al. | 229/93 |
| 2,943,540 | 7/1960 | McBain | 138/144 |
| 3,089,630 | 5/1963 | Garvin | 229/4.5 |
| 3,322,156 | 5/1967 | Stuart | 229/4.5 |
| 3,553,046 | 1/1971 | Rawford et al. | 156/184 |
| 3,643,888 | 2/1972 | Blue | 242/118.32 |
| 3,826,445 | 7/1974 | Le Hardy | 242/118.32 |
| 3,856,225 | 12/1974 | Wray | 242/118.32 |
| 3,972,468 | 8/1976 | Reid | 229/4.5 |
| 4,027,830 | 6/1977 | Dolan | 493/954 |
| 4,287,244 | 9/1981 | McMahon, Jr. et al. | 428/34.2 |
| 4,401,283 | 8/1983 | Kelley | 242/118.32 |
| 5,393,582 | 2/1995 | Wang et al. | 428/34.2 |
| 5,441,780 | 8/1995 | Bushnell et al. | 428/34.3 |
| 5,494,215 | 2/1996 | Drummond et al. | 229/4.5 |
| 5,505,395 | 4/1996 | Qiu et al. | 242/118.32 |
| 5,569,638 | 10/1996 | Shirai et al. | 428/34.2 |
| 5,846,619 | 12/1998 | Cahill et al. | 428/34.3 |

*Primary Examiner*—Rena L. Dye
*Attorney, Agent, or Firm*—Alston & Bird LLP

[57] ABSTRACT

A yarn support tube for supporting elastomeric yarns of the type having finish oil or emulsion applied to the yarn includes a tube core of paperboard, and an outer ply formed by spirally winding a laminated strip onto the tube core such that a butt joint is formed between edges of adjacent spiral turns of the strip. The laminated strip is formed of an inner paper layer and an outer layer of polypropylene film or the like which is substantially impervious to the finish emulsion. A sealing strip of polypropylene or the like, also substantially impervious to the finish emulsion, is spirally wound onto and adhered to the outer ply of the tube such that the strip spans and sealingly covers the butt joint. The sealing strip and polypropylene film layer cooperate to prevent finish emulsion from migrating into the tube core.

12 Claims, 1 Drawing Sheet

//6,066,373

ELASTOMERIC YARN SUPPORT TUBE AND METHOD OF MAKING SAME

FIELD OF THE INVENTION

The present invention relates to yarn support tubes.

BACKGROUND OF THE INVENTION

Yarn support tubes formed of multiple plies of spirally wound strips of paper or paperboard are conventionally used as support members onto which yarn is wound. The outer surface of the yarn support tube is selected to have particular characteristics, in terms of smoothness, friction coefficient, etc., depending on the particular type of yarn which is to be wound onto the tube.

In the case of elastomeric yarns, which typically are treated with a finish oil or emulsion, the outer surface of the support tube may include a layer of material which is impervious to the finish emulsion so as to prevent the emulsion from migrating into the paperboard core of the tube. For example, in one known yarn support tube for elastomeric yarn, the tube is formed of a paperboard tube core made by winding several thin plies of paperboard onto a mandrel with adhesive applied to the plies, the outermost paperboard ply being printed with an ink for visually distinguishing the tube. The outermost ply of the yarn support tube comprises a film of a copolymer of vinylidene chloride and vinyl chloride such as the film sold under the trademark SARAN®. The SARAN® film layer is formed in a strip slightly wider than the paperboard plies and is wound at the same spiral wind angle as the paperboard plies such that the SARAN® strip overlaps itself at the edges to form a spiral lap joint. A water-based adhesive is applied to the lower surface of the SARAN® strip and the strip is wound onto the tube core such that the adhesive creates a film-to-film bond of the SARAN® at the spiral lap joint. As the completed tube is advanced down the mandrel, the tube is cut into so-called "parent" tubes of 40–60 inches in length. The parent tubes are stored for a time to allow the adhesive to dry, and the parent tubes are then cut to the desired finished lengths to form completed yarn support tubes. The outer SARAN® layer forms a barrier which substantially prevents finish emulsion from being wicked into the paper tube core.

Although this yarn tube construction has been used successfully for many years, it has a number of disadvantages. For instance, it takes 6 to 8 hours for the water-based adhesive at the overlapping portions of SARAN® to dry and form a strong enough bond to allow finish trimming of the parent tubes. Anything touching or rubbing the SARAN® bond before it is set can result in the tube having to be scrapped. For example, as the tube advances down the mandrel and is cut by a saw into parent tube lengths, the SARAN® bond is sometimes disturbed with the result that the tube must be scrapped. Similarly, even when the parent tube is successfully cut, the SARAN® bond is sometimes disturbed during the 6 to 8 hour drying time when the tube comes into contact with other parent tubes being dried, resulting in further scrap.

Additionally, because of the low bond strength at the SARAN® overlap during formation of the tube, the spiral tube-forming machine generally must be run at a relatively low speed in order to reduce the stresses exerted on the tube so that tube scrap can be minimized.

Furthermore, SARAN® is relatively expensive. In short, the construction of yarn tubes using the SARAN® film suffers from problems of relatively high scrap, low throughput, and high cost. Despite these problems, however, SARAN® has traditionally been used because it offers good affinity for elastomeric yarns such as LYCRA®, i.e., the yarn is readily gripped by the tube during string-up when the winding of the yarn onto the tube is initiated.

SUMMARY OF THE INVENTION

The present invention overcomes the drawbacks associated with the SARAN® yarn tube as noted above, by providing a yarn support tube and a method of making such a tube in which there is no film-to-film bond requiring a long set-up time. Accordingly, the tube can be cut and handled immediately without compromising the emulsion resistance of the tube.

To these ends, the invention provides a yarn support tube comprising a hollow generally cylindrical tube core providing structural rigidity, and an outer ply defined by a laminated strip spirally wound onto and adhered to the tube core. The strip is formed of an inner substrate layer adjacent the tube core and an outer layer of polymer film laminated thereto and which forms the outer surface of the support tube, the polymer film being substantially impervious to the finish emulsion on the yarn. The laminated strip is spirally wound so as to form a butt joint between edges of adjacent spiral turns of the strip. The yarn support tube also includes a sealing strip of polymer which is substantially narrower than the laminated strip and which is spirally wound onto and adhered to the outer ply so as to span and sealingly cover the butt joint. The sealing strip is also substantially impervious to the finish emulsion. Thus, the outer polymer layer of the outer ply and the sealing strip cooperate to substantially prevent finish emulsion from migrating through the outer ply to the tube core.

The substrate layer of the laminated strip preferably comprises paper which is readily adhered to the tube core with water-based adhesive and quickly adheres with sufficient strength to permit cutting and handling of the tube almost immediately after formation on the mandrel.

The polymer film layer of the laminated strip preferably comprises polypropylene, which has an affinity for elastomeric yarns as good as or better than SARAN® such that the string-up efficiency of the tube is relatively high, is substantially impervious to finish emulsions and solvents, and is relatively inexpensive compared to SARAN®. The sealing strip preferably also comprises polypropylene, and advantageously has a pressure-sensitive adhesive (PSA) applied to the surface that faces the outer ply of the tube. The polypropylene strip with PSA forms an immediate bond with the polypropylene film of the outer ply, so that the tube can immediately be cut into parent tubes and then trimmed to finish the parent tubes into completed yarn support tubes, without disturbing the sealed butt joint. Accordingly, the scrap rate is substantially reduced. Furthermore, the spiral tube-making machine can be run at a faster speed than is possible with the SARAN® tube.

In accordance with a further preferred embodiment of the invention, the paper substrate layer is printed with an identifying color or indicia on the surface of the paper which faces the polymer film layer, and the polymer film permits viewing of the color or indicia through the film. Different colors and/or indicia may be used to facilitate differentiating different sizes and/or strengths of tubes.

BRIEF DESCRIPTION OF THE DRAWINGS

The above and other objects, features, and advantages of the invention will be made apparent from the following description of a preferred embodiment of the invention, when taken in conjunction with the accompanying drawings, in which.

DETAILED DESCRIPTION OF THE DRAWINGS

The invention is now explained by reference to a preferred embodiment thereof. However, it is to be understood that the invention is not limited to this embodiment, and the scope of the invention is defined by the appended claims which encompass the preferred embodiment as well as other embodiments having modifications and substitutions of equivalents.

Figure 1:
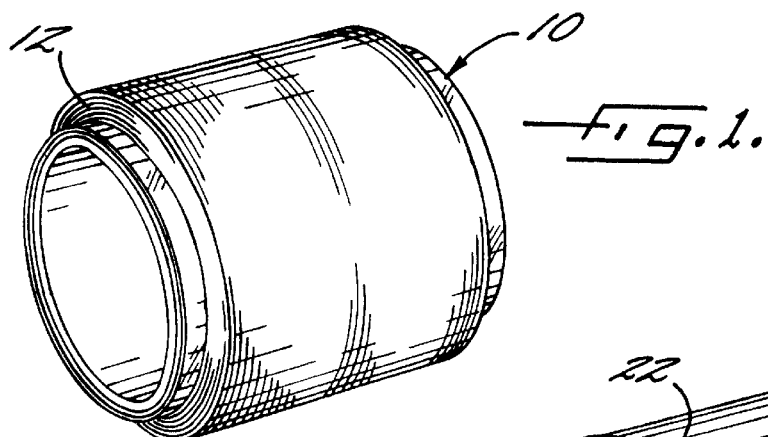
FIG. 1 is a perspective view of a yarn support tube supporting yarn wound thereon.

With reference to FIG. 1, a yarn support tube 10 in accordance with the invention is shown supporting a length of yarn 12 which is wound onto the tube. The yarn 12 may comprise an elastomeric yarn such as that sold under the trademark LYCRA®, which is a multi-stranded yarn composed of polymethylenedi-p-phenylene-diisocyanate/polytetramethyleneglycol, or polyethylene-butylene-adipate-copolyurea-urethane, and also containing dimethylacetamide, stabilizers, and pigments. LYCRA® and other elastomeric yarns also typically have one or more finish oils or emulsions, such as silicone oil or magnesium stearate, applied to the outer surface of the yarn for lubrication so that the yarn can be handled more easily by machinery.

When the elastomeric yarn 12 is manufactured, it is wound by the manufacturer onto yarn support tubes for shipment to and use by end users such as garment makers. Yarn manufacturers demand yarn support tubes that have good affinity for the yarn, meaning that the coefficient of friction between the yarn and the tube is high, such that initiating the winding of yarn onto the tube (called "stringing up" the yarn) can be readily accomplished. Stringing up is performed by at least partially wrapping the end portion of a length of yarn around the support tube and then rotating the support tube about its axis. Yarn tubes which have good affinity for the yarn readily grip the yarn so that there is little or no slippage of the yarn on the tube as the tube begins to rotate.

Figure 2:
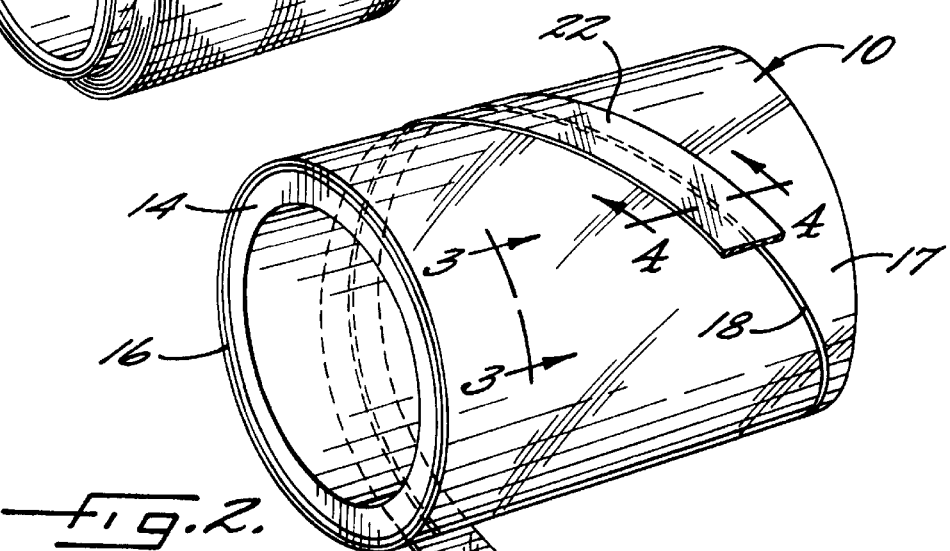
FIG. 2 is a perspective view of a yarn support tube in accordance with the invention, showing the sealing strip being spirally wound onto the outer ply of the tube covering the butt joint of the outer ply.
Figure 3:
FIG. 3 is a cross-sectional view of the tube taken on line 3—3 of FIG. 2, showing the multi-ply construction of the wall of the tube in accordance with a preferred embodiment of the invention.
Figure 4:
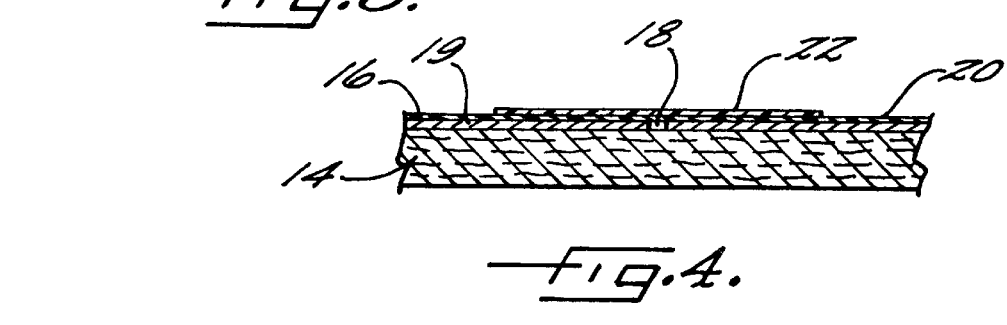
FIG. 4 is a cross-sectional view taken on line 4—4 of FIG. 2, showing the butt joint and the sealing strip covering the butt joint.

FIGS. 2–4 depict the construction of a yarn tube 10 in accordance with a preferred embodiment of the present invention. The tube 10 comprises a tube core 14, an outer ply 16, and a sealing strip 22. The tube core 14 is a hollow cylindrical member which serves to impart structural strength and rigidity to the tube. The tube core 14 is preferably constructed of a plurality of plies 15 of thin paperboard which are spirally wound onto each other on a forming mandrel (not shown) and are adhesively joined to one another, usually by applying an adhesive to each of the plies just before it is wound onto another of the plies. The core 14 advantageously has a wall thickness in the radial direction of about 5 mm (0.2 inch), but the particular thickness required depends largely on the desired strength of the tube. Spiral winding of tube cores is well known in the art, and further description of the method of forming the tube core is not necessary.

The outer ply 16 comprises a laminated strip 17 which is spirally wound onto and adhered to the tube core 14 such that a spiral butt joint 18 is defined between edges of adjacent spiral turns of the strip 17. The laminated strip 17 is formed of an inner substrate layer 19 and an outer polymer film layer 20 laminated to the outer surface of the substrate layer, the terms "inner" and "outer" as used herein referring to the relative positions of layers and surfaces thereof when the strip is wound onto the tube core 14. Thus, the outer polymer film layer 20 forms the outer surface of the yarn tube 10.

The substrate layer 19 preferably comprises paper which is readily adhered to a paperboard tube core 14 with water-based adhesive. For example, 40 pound bleached kraft paper is a suitable paper for the substrate layer. However, other types of paper and non-paper substrates may be used.

The polymer film layer 20 preferably comprises polypropylene, which is substantially impervious to finish emulsions and dimethylacetamide, and which also has an affinity for elastomeric yarns such as LYCRA® that is as good as or better than that of SARAN®.

The paper substrate layer 19 advantageously has a thickness of about 0.003–0.004 inch, and the polypropylene film layer 20 advantageously has a thickness of about 0.0005 inch.

To facilitate differentiating support tubes having different sizes and/or strengths, the upper surface of the paper layer 19 which faces the polymer film layer 20 advantageously is printed with an identifying color or indicia 21 prior to the film layer 20 being laminated to the paper layer. The polymer film layer is sufficiently transparent to permit the identifying color or indicia to be viewed through the film.

The sealing strip 22 preferably comprises a strip of polypropylene film having a thickness of about 0.0015–0.002 inch and a width of about 0.5 to 2 inches. The inner surface of the strip 22 which faces the outer ply 16 of the support tube has a pressure-sensitive adhesive (PSA) applied thereto. The strip 22 is spirally wound at the same spiral wind angle as the laminated strip 17 such that the strip 22 spans and sealingly covers the butt joint 18 between edges of adjacent spiral turns of the laminated strip 17. The strip 22 thus covers the gap at the butt joint 18 and seals the joint so that finish emulsion is substantially prevented from migrating through the butt joint to the tube core 14. Accordingly, the polymer film layer 20 and the sealing strip 22 cooperate to substantially prevent finish emulsion from being wicked into the tube core 14.

The sealing strip 22 with the PSA adheres with good bond strength to the polymer film layer 20 instantly upon being spirally wound onto the film layer. Thus, the strength of the butt joint seal is sufficient to allow cutting of the tube into parent tubes without disturbing the integrity of the seal, and to allow the parent tubes to be immediately trimmed to finished lengths, if desired. There is no need to air dry or hot box dry the parent tubes as the SARAN® tubes require before they can be trimmed. Scrap is also substantially reduced because of the significantly greater bond strength of the butt joint seal.

From the foregoing, it will be appreciated that the invention provides a unique yarn support tube which is essentially impervious to finish emulsions on elastomeric yarns, which has a surface having good affinity for such yarns, which can be manufactured with substantially reduced scrap rates and at higher machine speeds than the SARAN® tubes which are conventionally used for elastomeric yarns, and which can be made less expensively than the SARAN® tubes because of the reduced material cost and increased manufacturing efficiency made possible by the construction of the tube provided by the invention.

The invention has been explained by describing a preferred embodiment thereof in considerable detail. However, the invention is not limited to the described embodiment, and modifications and substitutions may be made without departing from the scope of the invention as set forth in the appended claims.

What is claimed is:

1. A support tube for elastomeric yarn of the type which may include a finish emulsion applied to the yarn, comprising:

a hollow generally cylindrical tube core providing structural rigidity to the support tube;

an outer ply defined by a laminated strip spirally wound onto and adhered to the tube core, the strip being formed of an inner substrate layer adjacent the tube core and an outer layer of polymer film laminated thereto and which forms the outer surface of the support tube, the polymer film being substantially impervious to the finish emulsion on the yarn, the laminated strip being spirally wound so as to form a butt joint between edges of adjacent spiral turns of the strip; and a sealing strip of polymer which is substantially narrower than the laminated strip and which is spirally wound onto and adhered to the outer ply so as to span and sealingly cover the butt joint, the sealing strip being substantially impervious to the finish emulsion, whereby the outer polymer layer of the outer ply and the sealing strip cooperate to substantially prevent finish emulsion from migrating through the outer ply to the tube core.

2. The yarn support tube of claim 1, wherein the substrate layer comprises paper.

3. The yarn support tube of claim 2, wherein the surface of the paper layer facing the outer layer of polymer film is printed with identifying color or indicia prior to being laminated to the polymer film, and wherein the polymer film permits viewing of the color or indicia therethrough.

4. The yarn support tube of claim 2, wherein the polymer film comprises polypropylene.

5. The yarn support tube of claim 4, wherein the sealing strip comprises a polypropylene strip having a pressure-sensitive adhesive on the surface thereof which faces the outer ply of the support tube.

6. The yarn support tube of claim 5, wherein the paper layer is about 0.003–0.004 inch thick and the polypropylene film layer is about 0.0005 inch thick.

7. The yarn support tube of claim 6, wherein the polypropylene strip is about 0.0015–0.002 inch thick.

8. The yarn support tube of claim 6, wherein the polypropylene strip is about 0.5 to 2 inches wide.

9. A method of making a support tube for elastomeric yarn of the type having a finish emulsion applied thereto, the method comprising the steps of:

providing a hollow generally cylindrical tube core which is substantially rigid;

providing a laminated strip having a substrate layer onto which is laminated a polymer film which is substantially impervious to the finish emulsion;

forming an outer ply of the support tube by spirally winding and adhering the laminated strip onto the tube core with the substrate layer adjacent the tube core such that a butt joint is defined between edges of adjacent spiral turns of the strip and so that the polymer film forms the outer surface of the support tube;

providing a sealing strip which is formed of polymer substantially impervious to the finish emulsion and which is substantially narrower than the laminated strip; and spirally winding and adhering the sealing strip onto the outer ply so as to span and sealingly cover the butt joint, whereby the polymer film of the laminated strip and the sealing strip cooperate to substantially prevent finish emulsion from migrating through the outer ply to the tube core.

10. The method of claim 9, wherein the step of providing the laminated strip comprises providing a laminated strip formed of a paper layer with polypropylene film laminated thereto.

11. The method of claim 10, wherein the step of providing the laminated strip comprises providing a laminated strip having identifying color or indicia printed on the surface of the paper layer facing the polypropylene film, and wherein the polypropylene film permits viewing of the identifying color or indicia therethrough.

12. The method of claim 10, wherein the step of providing the sealing strip comprises providing a polypropylene strip having a pressure-sensitive adhesive on the surface thereof which faces the outer ply of the support tube.

* * * * *